United States Patent
Takeda et al.

(10) Patent No.: US 6,438,213 B2
(45) Date of Patent: *Aug. 20, 2002

(54) MESSAGE PROCESSING METHOD, DEVICE, SYSTEM AND RECORDING MEDIUM

(75) Inventors: Kenji Takeda; Tomoki Osawa, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,421

(22) Filed: Apr. 14, 1998

(30) Foreign Application Priority Data

Apr. 15, 1997 (JP) .............................................. 9-113533

(51) Int. Cl.[7] .............................. H04M 1/64; H04M 3/42
(52) U.S. Cl. ................ 379/67.1; 378/88.04; 378/88.18; 378/88.22; 378/201.01
(58) Field of Search .......................... 379/67, 83, 88.04, 379/88.13, 93.25, 100.09, 88.18, 88.23, 67.1, 88.17, 88.19, 88.2, 88.21, 88.22–88.28, 70, 76, 88.14, 201.01, 210.01; 455/412, 413

(56) References Cited

U.S. PATENT DOCUMENTS

| | | | | |
|---|---|---|---|---|
| 4,757,525 A | * | 7/1988 | Matthews et al. | 379/88 |
| 4,972,461 A | * | 11/1990 | Brown et al. | 379/67.1 |
| 5,509,061 A | * | 4/1996 | Amereller et al. | 379/207 |
| 5,623,538 A | * | 4/1997 | Petty | 379/67.1 |
| 5,631,948 A | * | 5/1997 | Bartholomew et al. | 379/67 |
| 5,661,782 A | * | 8/1997 | Bartholomew et al. | 379/67 |
| 5,706,211 A | * | 1/1998 | Beletic et al. | 364/514 R |
| 5,812,639 A | * | 9/1998 | Bartholomew et al. | 379/88 |
| 5,835,896 A | * | 11/1998 | Fisher et al. | 705/37 |
| 5,909,483 A | * | 6/1999 | Weare et al. | 379/88.18 |
| 5,946,386 A | * | 8/1999 | Rogers et al. | 379/265 |
| 6,215,858 B1 | * | 4/2001 | Bartholomew et al. | 379/88.17 |

FOREIGN PATENT DOCUMENTS

| | | |
|---|---|---|
| JP | 63-211840 | 9/1988 |
| JP | 64-19854 | 1/1989 |
| JP | 5-7720 | 1/1993 |
| JP | 8-272714 | 10/1996 |
| JP | 9-8839 | 1/1997 |

* cited by examiner

*Primary Examiner*—Allan Hoosain

(57) ABSTRACT

A message processing method is provided for transmitting a transmit message while adding a unique transmit ID to identify the transmission of a transmit message to the transmit message; registering the correspondence between the transmit message and the transmit ID into a storage when the transmit message is transmitted; and judging that a receive message is related with a previously-transmitted transmit message when the receive message to which ID identical with a transmit ID registered in the storage is added is received. Also disclosed is a message processing device which has a storage; a transmission-managing means for adding a unique transmit ID to identify the transmission of a transmit message to the transmit message, and for registering the correspondence between the transmit message and the transmit ID into the storage when the transmit message is transmitted; a message transmitter for transmitting a transmit message provided with a transmit ID by the transmission-managing means; and a transmission-related detector for judging that a receive message is related with a previously-transmitted transmit message when the receive message to which ID identical with a transmit ID registered with the storage is added is received.

7 Claims, 15 Drawing Sheets

MESSAGE PROCESSING METHOD, DEVICE, SYSTEM AND RECORDING MEDIUM

FIELD OF THE INVENTION

This invention relates to a message communication technique, and more particularly to, a technique for detecting the reception or transmission of a message related with a previously-transmitted or -received message.

BACKGROUND OF THE INVENTION

Conventionally, such a technique is used to manage the reception of a reply message to a request message, to manage the transmission of a circular message and to provide an additional service function as to the relation between messages, in the utilization manner that several messages are communicated being related with each other, e.g., a reciprocative message and a circular message. For example, Japanese patent application laid-open No. 9-8839 (1997) discloses an electronic message service technique for confirming a reply message to a transmit message which is provided with a transmit message managing means for storing and managing the content of a transmit message, and means for comparing the content of reply message with the content of transmit message managed by the transmit message managing means. When it receives a message, the comparing means searches transmit messages managed by the transmit message managing means by using a title and a sender to be described in the received message. When a transmit message with a title and a receiver that are identical with the title and sender in the received message is found as the result of researching, it is judged that the received message is the reply message to the transmit message. When no corresponding transmit message is found, it is judged that the received message is not any reply message to a previously-transmitted message.

However, there are problems in the conventional electronic message service technique. The first problem is that an unrelated receive message may be erroneously judged as the related message. This is because the relation between messages is judged on the basis of the message-dependent values, such as a title and a sender, that even an unrelated message can have the same values.

The second problem is that even a related message may be erroneously judged as an unrelated message. This is because the relation between messages is judged on the basis of the message title that the receiver can edit. Namely, when the receiver makes a reply message, he may edit a title such as "reply to (original title)". In this case, the reply message must be judged as unrelated message to the transmit message in the conventional electronic message service technique.

SUMMARY OF THE INVENTION

Accordingly, it is an object of the invention to provide a message processing method by which a message related with a previously-transmitted or -received message can be securely detected.

It is a further object of the invention to provide a message processing device by which a message related with a previously-transmitted or -received message can be securely detected.

It is a still further object of the invention to provide a message processing system by which a message related with a previously-transmitted or -received message can be securely detected.

It is a still yet further object of the invention to provide a recording medium by using which a message related with a previously-transmitted or -received message can be securely detected.

According to the invention, a message processing method, comprises the steps of:

transmitting a transmit message while adding a unique transmit ID to identify the transmission of a transmit message to the transmit message;

registering the correspondence between the transmit message and the transmit ID into a storage when the transmit message is transmitted; and judging that a receive message is related with a previously-transmitted transmit message when the receive message to which ID identical with a transmit ID registered in the storage is added is received.

According to another aspect of the invention, a message processing method, comprises the steps of:

generating a unique receive ID to identify the reception of a receive message when the receive message is received;

registering the correspondence between the receive message and the generated receive ID;

judging that a transmit message is related with a previously-received receive message when the transmit message to which ID identical with a receive ID registered in the storage is added is transmitted.

According to another aspect of the invention, a message processing method, comprises the steps of:

generating a unique receive ID to identify the reception of a receive message when the receive message to which a unique transmit ID is added by a sender is received;

registering the receive message into a storage while adding the generated receive ID to the receive message;

extracting a transmit ID given by the sender from a receive message to which a receive ID identical with ID added to a transmit message is added of receive messages to be registered in the storage when the transmit message provided with the ID identical with the receive ID registered in the storage is transmitted; and transmitting the transmit message while adding the extracted transmit ID to the transmit message.

According to another aspect of the invention, a message processing method, comprises the steps of:

transmitting a transmit message to a second message processing device while adding a unique transmit ID to identify the transmission of a transmit message to the transmit message, and registering the correspondence between the transmit message and the transmit ID into a first storage, when the transmit message is transmitted, by using a first message processing device; and generating a unique receive ID to identify the reception of a receive message when the receive message is received from the first message processing device, registering the receive message into a second storage while adding the generated receive ID to the receive message, extracting a transmit ID given by the first message processing device from a receive message to which a receive ID identical with ID added to a transmit message by the user is added of receive messages to be registered in the second storage when the transmit message provided with the ID by the user is transmitted, and transmitting the transmit message to the first message processing device while adding the extracted transmit ID to the transmit message, by using the second message processing device;

wherein the first message processing device judges that a receive message is related with a previously-transmitted transmit message when the receive message to which ID identical with a transmit ID registered in the first storage is added is received from the second message processing device.

According to another aspect of the invention, a message processing device, comprises:

a storage;

a transmission-managing means for adding a unique transmit ID to identify the transmission of a transmit message to the transmit message, and for registering the correspondence between the transmit message and the transmit ID into the storage when the transmit message is transmitted;

a message transmitter for transmitting a transmit message provided with a transmit ID by the transmission-managing means; and a transmission-related detector for judging that a receive message is related with a previously-transmitted transmit message when the receive message to which ID identical with a transmit ID registered in the storage is added is received.

According to another aspect of the invention, a message processing device, comprises:

a storage;

a reception-managing means for generating a unique receive ID to identify the reception of a receive message when the receive message is received, and for registering the correspondence between the receive message and the generated receive ID into the storage; and a reception-related detector for judging that a transmit message is related with a previously-received receive message when the transmit message to which ID identical with a receive ID registered in the storage is added is transmitted.

According to another aspect of the invention, a message processing device, comprises:

a storage;

a reception-managing means for generating a unique receive ID to identify the reception of a receive message when the receive message to which a unique transmit ID is added by a sender is received, and for registering the receive message into the storage while adding the generated receive ID to the receive message;

an other's information adding means for extracting a transmit ID given by the sender from a receive message to which a receive ID identical with ID added to a transmit message is added of receive messages to be registered in the storage when the transmit message provided with the ID identical with the receive ID registered in the storage is transmitted, and for adding the extracted transmit ID to the transmit message; and a message transmitter for transmitting the transmit message provided with the transmit ID by the other's information adding means.

According to another aspect of the invention, a message processing system, comprises:

a first message processing device which comprises a first storage, a transmission-managing means for adding a unique transmit ID to identify the transmission of a transmit message to the transmit message and for registering the correspondence between the transmit message and the transmit ID into the first storage when the transmit message is transmitted, a message transmitter for transmitting a transmit message provided with a transmit ID by the transmission-managing means to a second message processing device, and a transmission-related detector for judging that a receive message is related with a previously-transmitted transmit message when the receive message to which ID identical with a transmit ID registered in the first storage is added is received from the second message processing device; and the second message processing device which comprises a second storage, a reception-managing means for generating a unique receive ID to identify the reception of a receive message when the receive message is received from the first message processing device, and for registering the receive message into the second storage while adding the generated receive ID to the receive message, an other's information adding means for extracting a transmit ID given by the first message processing device from a receive message to which a receive ID identical with ID added to a transmit message by the sender is added of receive messages to be registered in the second storage when the transmit message is transmitted and for adding the extracted transmit ID to the transmit message, and a message transmitter for transmitting the transmit message provided with the transmit ID by the other's information adding means to the first message processing device.

Further, provided according to another aspect of the invention is a mechanically-readable recording medium which stores a program to operate a computer as a transmission-managing means for adding a unique transmit ID to identify the transmission of a transmit message to the transmit message, and for registering the correspondence between the transmit message and the transmit ID into a storage when the transmit message is transmitted, a message transmitter for transmitting a transmit message provided with a transmit ID by the transmission-managing means, and a transmission-related detector for judging that a receive message is related with a previously-transmitted transmit message when the receive message to which ID identical with a transmit ID registered in the storage is added is received.

Also, provided according to another aspect of the invention is a mechanically-readable recording medium which stores a program to operate a computer as a reception-managing means for generating a unique receive ID to identify the reception of a receive message when the receive message is received and for registering the correspondence between the receive message and the generated receive ID into a storage, and a reception-related detector for judging that a transmit message is related with a previously-received receive message when the transmit message to which ID identical with a receive ID registered in the storage is added is transmitted.

Also, provided according to another aspect of the invention is a mechanically-readable recording medium which stores a program to operate a computer as a reception-managing means for generating a unique receive ID to identify the reception of a receive message when the receive message to which a unique transmit ID is added by a sender is received and for registering the receive message into a storage while adding the generated receive ID to the receive message, an other's information adding means for extracting a transmit ID given by the sender from a receive message to which a receive ID identical with ID added to a transmit message is added of receive messages to be registered in the storage when the transmit message provided with the ID identical with the receive ID registered in the storage is transmitted and for adding the extracted transmit ID to the transmit message, and a message transmitter for transmitting the transmit message provided with the transmit ID by the other's information adding means.

Also, provided according to another aspect of the invention is a mechanically-readable recording medium, which stores a program to operate a computer for a first message processing device as a transmission-managing means for adding a unique transmit ID to identify the transmission of a transmit message to the transmit message and for registering the correspondence between the transmit message and the transmit ID into a first storage when the transmit message is transmitted, a message transmitter for transmitting a transmit message provided with a transmit ID by the transmission-managing means to a second message processing device, and a transmission-related detector for judging that a receive message is related with a previously-transmitted transmit message when the receive message to which ID identical with a transmit ID registered in the first storage is added is received from the second message processing device, and to operate a computer for the second message processing device as a reception-managing means for generating a unique receive ID to identify the reception of a receive message when the receive message is received from the first message processing device, and for registering the receive message into a second storage while adding the generated receive ID to the receive message, an other's information adding means for extracting a transmit ID given by the first message processing device from a receive message to which a receive ID identical with ID added to a transmit message by the sender is added of receive messages to be registered in the second storage when the transmit message is transmitted and for adding the extracted transmit ID to the transmit message, and a message transmitter for transmitting the transmit message provided with the transmit ID by the other's information adding means to the first message processing device.

First, in this invention, it can be judged whether a receive message is a reply to a previously-transmitted message or not when the receive message is received. This is achieved by transmitting a message while adding a transmit ID to identify the transmission thereof, registering the correspondence between the transmit ID and the message into a storage, and judging whether the receive message is related with a previously-transmitted or not based on the transmit ID registered in the storage and ID added to the receive message when receiving the message.

Second, in this invention, it can be judged whether a transmit message is related to a previously-received message or not when the transmit message is sent. This is achieved by generating a receive ID to identify the reception of a receive message, registering the correspondence between the receive ID and the receive message into a storage, and judging whether the transmit message is related with a previously-received or not based on the receive ID registered in the storage and ID added to the transmit message when sending the transmit message.

Third, in this invention, a transmit ID added to a transmit message can be securely added to a reply message to the transmit message. This is achieved by generating a receive ID to identify the reception of a message, adding the generated receive ID to the receive message and registering the receive message in a storage, and adding a transmit ID given to the receive message to a transmit message when the transmit message has the same ID as the receive ID registered in the storage.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
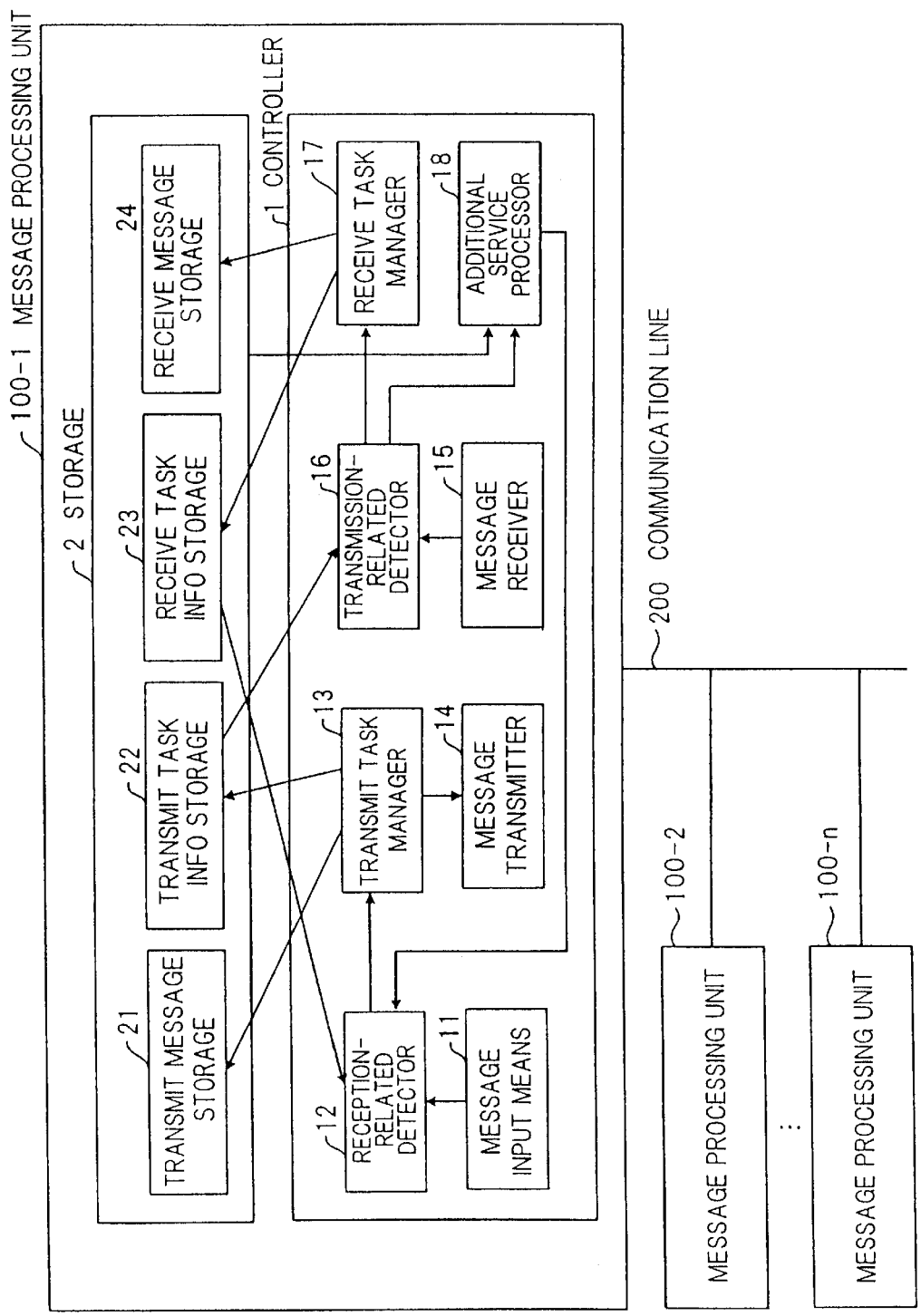
FIG. 1 is a block diagram showing a message processing device in a first preferred embodiment according to the invention.

Message processing method and device including system and recording medium in the first preferred embodiment will be explained in FIG. 1. As shown, several message processing units 100-1 to 100-n are connected through a communication line 200.

The message processing unit 100-1 is provided with a controller 1 and a storage 2. The other message processing units are also implemented like the message processing unit 100-1.

The storage 2 is provided with a transmit message storage 21, a transmit task information storage 22, a receive task information storage 23 and a receive message storage 24.

The copy of a transmit message is registered in the transmit message storage 21.

An identification code, which is hereinafter referred to as 'ID', (transmit ID) to identify the transmission of a transmit message and a message ID of the transmit message are registered in the transmit task information storage 22 while being related to each other.

ID (receive ID) to identify the reception of a receive message and a message ID of the receive message are registered in the receive task information storage 22 while being related to each other.

The copy of a receive message is registered in the receive message storage 24.

The controller 1 is provided with a message input means 11, a reception-related detector 12, a transmit task manager 13, a message transmitter 14, a message receiver 15, a transmission-related detector 16, a receive task manager 17 and an additional service processor 18.

Figure 2:
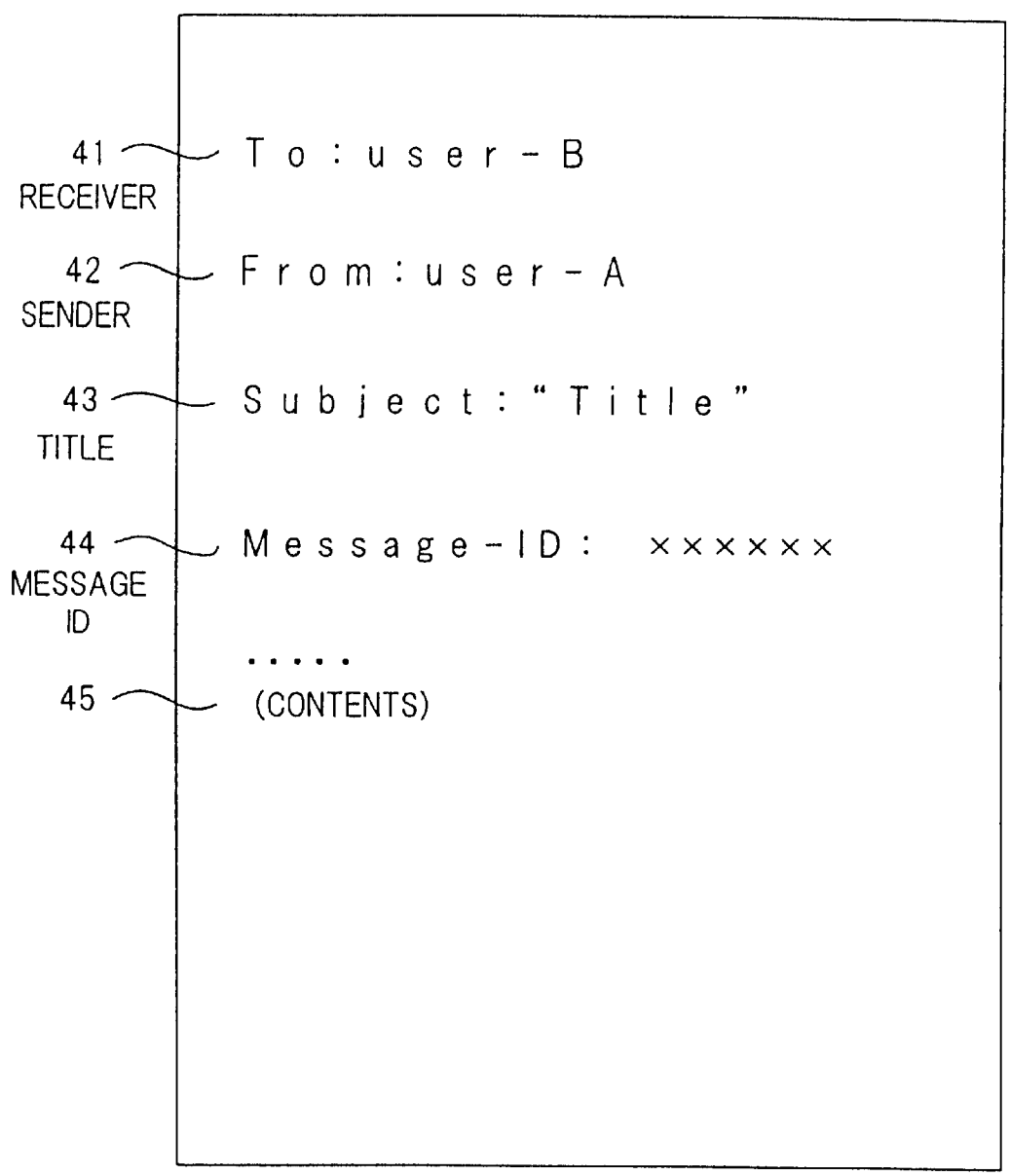
FIG. 2 is an illustration showing an example of a message.

The message input means 11 serves to make a message according to the operation of a user. The message made by the message input means 11, as shown in FIG.2, includes a receiver 41, a sender 42, a title 43, a message ID 44 and a content 45.

The functions of the reception-related detector 12 are to inspect whether a first ID identical with a receive ID registered in the receive task information storage 23 is added to the transmit message made by the message input means 11 or not, and to send the first ID and the message ID 44 of the transmit message to the additional service processor 18 when the first ID is added to the transmit message. Herein, first ID means ID to be added to a transmit message by the user when he makes the transmit message related to a previously-received message, and corresponds with a receive ID to be added to the receive message.

The functions of the transmit task manager 13 are to register a copy of transmit message into the transmit message storage 21, to generate a unique transmit ID to identify the transmission of a transmit message, to register the generated transmit ID and the message ID of the transmit message into the transmit task information storage 22 while relating to each other, and to add the generated transmit ID to the transmit message.

The functions of the message transmitter 14 are to transmit a transmit message to the communication line 200 to send it to the receiver 41 set in the transmit message and to send a transmit message, to the message receiver 15 of its own unit. Namely, when the receiver 41 is the user of another message processing unit, the transmit message is sent to the communication line 200, and, when the receiver 41 is the user of its own unit, the transmit message is sent to the message receiver 15 of its own unit.

The function of the message receiver 15 is to receive a message sent through the communication line 200 from another message processing unit and a message sent from the message transmitter 14 of its own unit.

The functions of the transmission-related detector 16 are to inspect whether a second ID identical with a transmit ID registered in the transmit task information storage 22 is added to the receive message received by the message receiver 15 or not, and to send the second ID and the message ID of the receive message to the additional service processor 18 when the second ID is added to the receive message. Herein, second ID means ID to be added to a transmit message by the user when he makes the transmit message related to a previously-received message, and corresponds with a transmit ID to be added to the receive message by the sender.

The functions of the receive task manager 17 are to generate a unique receive ID to identify the reception of a receive message when receiving the receive message, to register the generated receive ID and the message ID of the receive message into the receive task information storage 23 while relating to each other, and to register the receive message into the receive message storage 24 while adding the generated receive ID to the receive massage.

The functions of the additional service processor 18 are to inform the user of the reception of a message related to a previously-transmitted message by, e.g., displaying a proper message on a display (not shown) when it receives the notification from the transmission-related detector 16, and to determine the receiver of the transmit message according to the receiver of a previously received message registered in the receive message storage 24 to be related with the transmit message when it receives the notification from the reception-related detector 12. Thus, it conducts the corresponding additional service when the transmission-related detector 16 or reception-related detector 12 detects the reception or transmission of a message to be related with a previously-transmitted or -received message.

Figure 3:
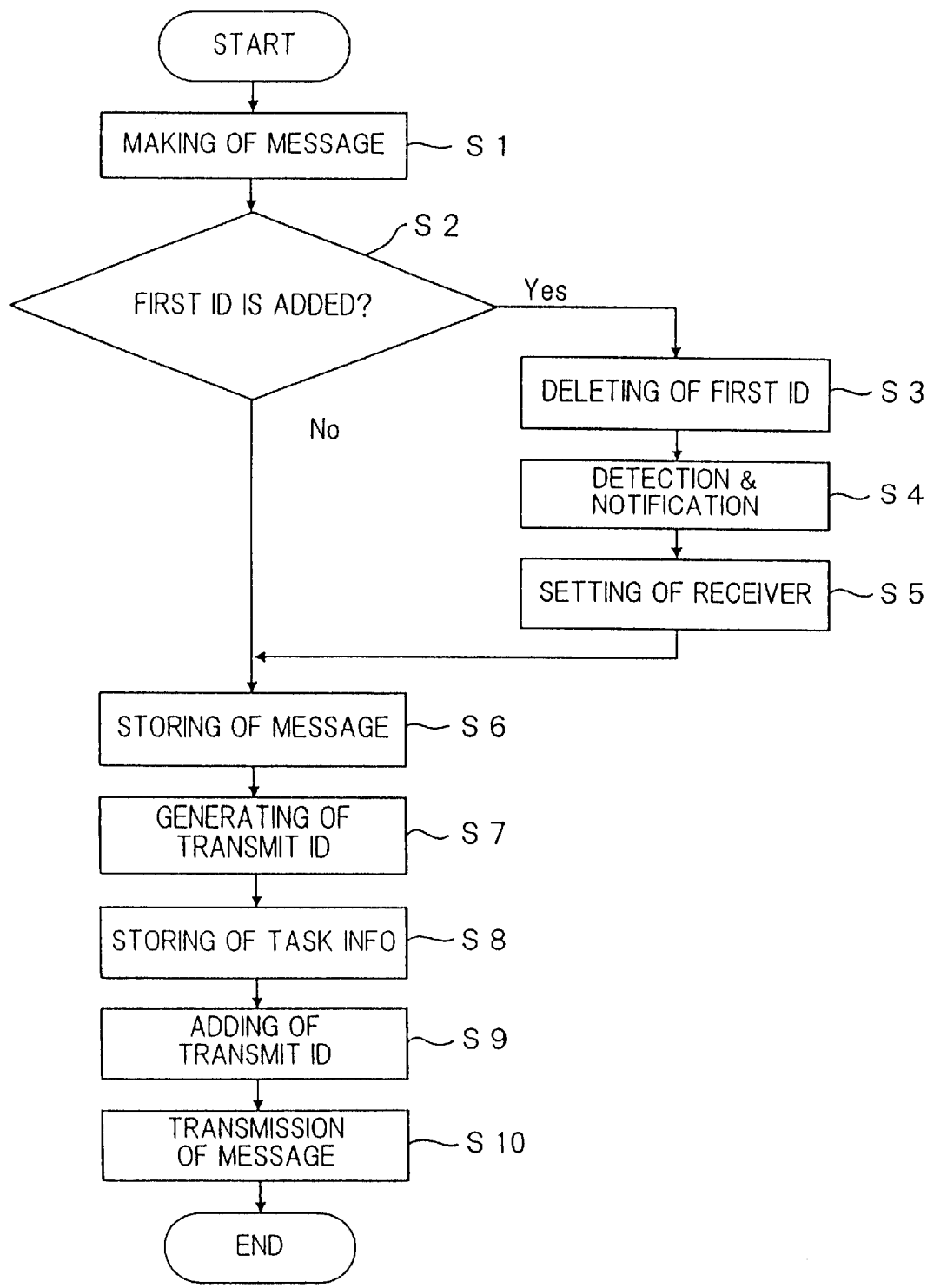
FIG. 3 is a flow chart illustrating an example of the message-transmitting process of message processing units 100-1 to 100-n.
Figure 4:
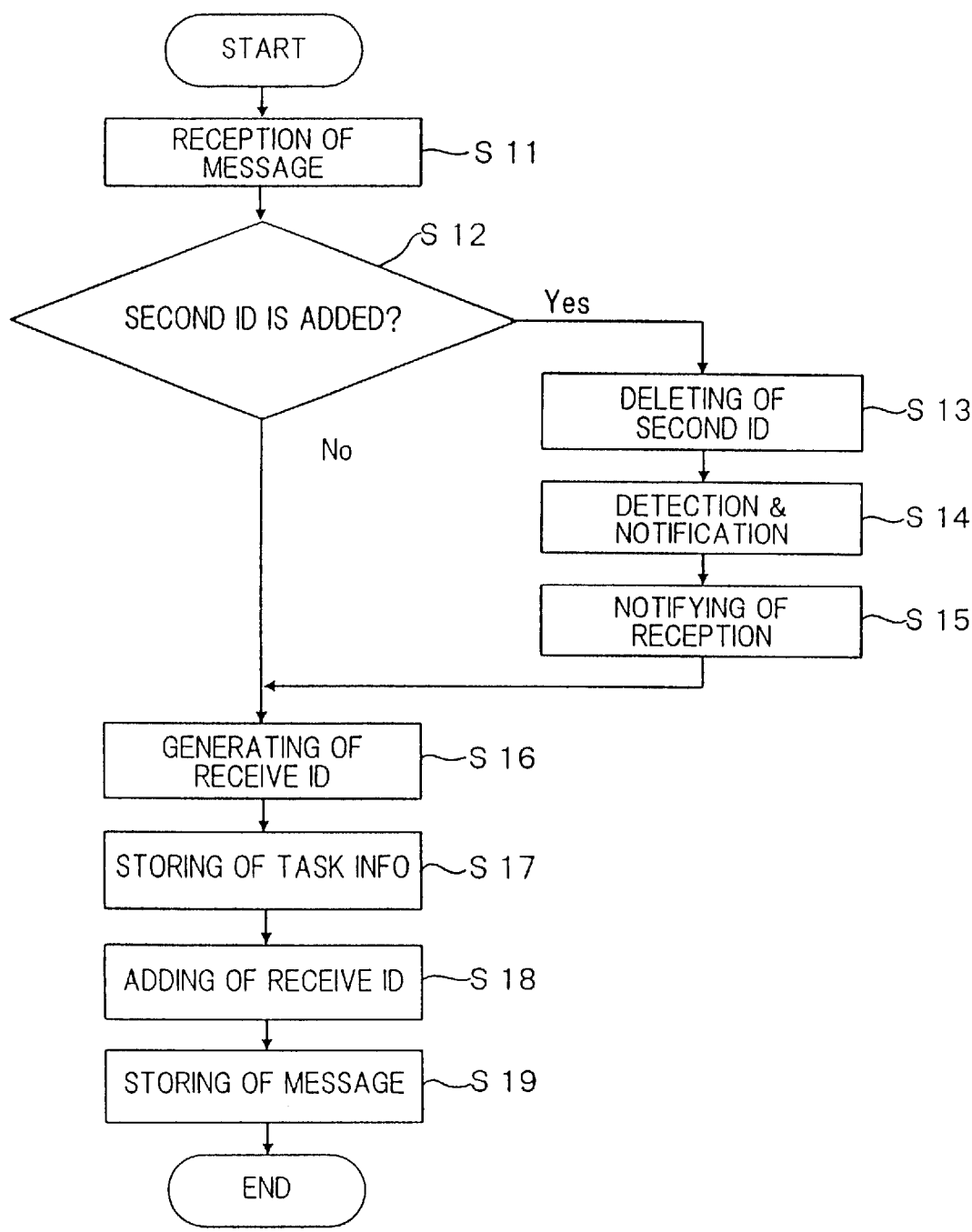
FIG. 4 is a flow chart illustrating an example of the message-receiving process of the message processing units 100-1 to 100-n.

Referring to FIGS. 3 and 4, the operations of the message processing method and device in the first embodiment will be explained below. FIG. 3 is a flow chart showing an example of the message transmitting operation in the message processing units 100-1 to 100-n, and FIG. 4 is a flow chart showing an example of the message-receiving operation in the message processing units 100-1 to 100-n.

First, the message-transmitting operation will be explained taking the example that the message processing unit 100-1 transmits a message.

A transmit message is made using the message input means 11 according to user's operation, and then the transmit message made is sent to the reception-related detector 12 (FIG. 3, S1). Only when making the transmit message to be related with a previously-received message, the user adds a receive ID given to a previously-received message to be related with the transmit message as a first ID to the transmit message, and adds a transmit ID, which is given to a previously-received message to be related with the transmit message by the originally-transmitting message processing unit, as a second ID to the transmit message.

The reception-related detector 12 inspects whether a first ID identical with a receive ID registered in the receive task information storage 23 is added to the transmit message sent from the message input means 11 or not (S2).

When it is judged that the first ID is not added ('No' at S2), the reception-related detector 12 sends the transmit message to the transmit task manager 13.

On the contrary, when it is judged that the first ID is added ('Yes' at S2), the first ID added to the transmit message is deleted from the transmit message (S3), and then the message ID 44 of the transmit message and the first ID added to the transmit message are notified to the additional service-processor 18 (S4).

Receiving this notification, the additional service processor 18 determines the receiver of the transmit message according to the receiver corresponding to a receive message identified by the first ID (receive message with a receive ID identical with the first ID) of receive messages stored in the receive message storage 24, and sends the determined receiver to the reception-related detector 12 (S5). Then, the reception-related detector 12 assigns the receiver sent from the additional service processor 18 to the transmit message, and then sends the transmit message set with the receiver to the transmit task manager 13.

The process in S5 will be detailed below. When user A sends a message to request user B to reply, the receiver 41 of the transmit message is set to be "user-B→user-A". Also, when sending a message to request user B to circulate it through users C, D, the receiver is set to be "user-B→user-C→user-D". For example, when the receiver 41 assigned to the receive message identified by the first ID added to the transmit message is "user-B→user-A", the receiver of the transmit message is determined to be "user-A". Also, for example, in case of "user-B→user-C→user-D", the receiver of the transmit message is determined to be "user-C→user-D". Thus, the receiver of the transmit message is determined deleting a top user name from the receiver 41 given to a receive message.

The transmit task manager 13 registers the transmit message sent from the reception-related detector 12 into the transmit message storage 21 (S6), then generating a transmit ID to identify the transmission of the transmit message (S7). Thereafter, the transmit task manager 13 registers the message ID and transmit ID of the transmit message into the transmit task information storage 22 while relating to each other (S8), further adding the transmit ID to the transmit message, then sending it to the message transmitter 14 (S9)

Then, the message transmitter 14 transmits the transmit message sent from the transmit task manager 13 through the communication line 200 to another message processing unit or the message receiver 15 of its own unit according to the receiver 41 of the transmit message (S10).

Next, the message-receiving operation will be explained in FIG. 4.

The message receiver 15 receives a message through the communication line 200 or from the message transmitter 14 of its own unit, then sending it to the transmission-related detector 16 (S1).

The transmission-related detector 16 inspects whether a second ID identical with a transmit ID registered in the transmit task information storage 22 is added to the receive message or not (S12).

When it is judged that the second ID is not added ('No' at S12), the transmission-related detector 16 sends the receive message to the receive task manager 17.

On the contrary, when it is judged that the second ID is added ('Yes' at S12), the transmission-related detector 16 deletes the second ID added to the receive message (S13), then sending the second ID and the message ID of the receive message to the additional service processor 18 as well as sending the receive message to the receive task manager 17 (S14).

The additional service processor 18 informs the user of the reception of a message related to a previously-transmitted message by, e.g., displaying the second ID and the message ID of the receive message on a display (not shown) (S15).

The receive task manager 17 generates a unique receive ID to identify the reception of the transmit message when the receive message is sent from the transmission-related detector 16 (S16), then registering the generated receive ID and the message ID of the receive message into the receive task information storage 23 while relating to each other (S17). Further, the receive task manager 17 adds the receive ID generated at S16 to the receive message, then registering it into the receive message storage 24 (S18, S19).

Next, operations conducted when user A of the message processing unit 100-1 transmits a message to request a reply from user B of the message processing unit 100-2 will be explained.

User A makes the transmit message by using the message input means 11 (FIG. 3, S1). In this case, the receiver 41 of the transmit message is set to be "user-B→user-A". Also, the first and second IDs are not given as the transmit message made is not related to any one of previously-received messages.

The reception-related detector 12 inspects whether a first ID is added to the transmit message or not when the transmit message is made by the message input means 11 (S2). In this case, the reception-related detector 12 sends the transmit message made by the message input means 11 to the transmit task manager 13 as no first ID is added to the transmit message.

The transmit task manager 13 registers the transmit message sent from the reception-related detector 12 into the transmit message storage 21, then generating a transmit ID to identify the transmission of the transmit message (S6, S7). Thereafter, the transmit task manager 13 registers the message ID of the transmit message and the transmit ID generated in S7 into the transmit task information storage 22 while relating to each other, further adding the transmit ID to the transmit message, then sending it to the message transmitter 14 (S8, S9).

Then, the message transmitter 14 transmits the transmit message sent from the transmit task manager 13 through the communication line 200 to the message processing unit 100-2 according to the receiver 41 of the transmit message (S10).

The message receiver 15 of the message processing unit 100-2 receives the message (receive message) transmitted from user A, then sending it to the transmission-related detector 16 (FIG. 4, S11).

The transmission-related detector 16 sends the receive message to the receive task manager 17 as no second ID is added ('No' at S12) to the receive message sent from the message receiver 15.

The receive task manager 17 generates a unique receive ID to identify the reception of the receive message when the receive message is sent from the transmission-related detector 16, then registering the generated receive ID and the message ID of the receive message into the receive task information storage 23 while relating to each other (S16, S17). Further, the receive task manager 17 adds the receive ID generated at S16 to the receive message, then registering it into the receive message storage 24 (S18, S19).

User B reads the message from user A registered in the receive message storage 24, judging that a reply message needs to be sent to user A, then making the reply message by using the message input means 11 (FIG. 3, S1). In this case, user B adds the receive ID given to the message from user A as a first ID to the reply message as well as adding the transmit ID given to the message from user A as a second ID to the reply message.

The reception-related detector 12 deletes the first ID from the reply message as the judgement at S2 becomes "Yes" when the reply message is made by the message input means 11, then informing the additional service processor 18 of the message ID of the reply message and the first ID that was given to the reply message (S3, S4).

Receiving this information, the additional service processor 10 determines the receiver of the reply message to be "user-A" according to "user-B→user-A" set as the receiver 41 in the message sent from user A, and sends the determined receiver to the reception-related detector 12 (S5). Then, the reception-related detector 12 assigns "user-A" to the receiver 41 of the reply message, and then sends it to the transmit task manager 13.

The transmit task manager 13 registers the reply message sent from the reception-related detector 12 into the transmit message storage 21, then generating a transmit ID to identify the transmission of the reply message, further registering the transmit ID and the message ID of the reply message into the transmit task information storage 22 while relating to each other (S6 to S8). Thereafter, transmit task manager 13 adds the transmit ID generated at S7 to the reply message (S9), then transmitting it through the message transmitter 14 to the message processing unit 100-1 (S10).

The message receiver 15 of the message processing unit 100-1 receives the reply message transmitted from user B, then sending it to the transmission-related detector 16 (FIG. 4. S11).

The transmission-related detector 16 deletes the second ID in the reply message as the judgement at S12 becomes Yes, then sending the second ID and the message ID of the reply message to the additional service processor 18 as well as sending the reply message to the receive task manager 17 (S13, S14).

Figure 5:
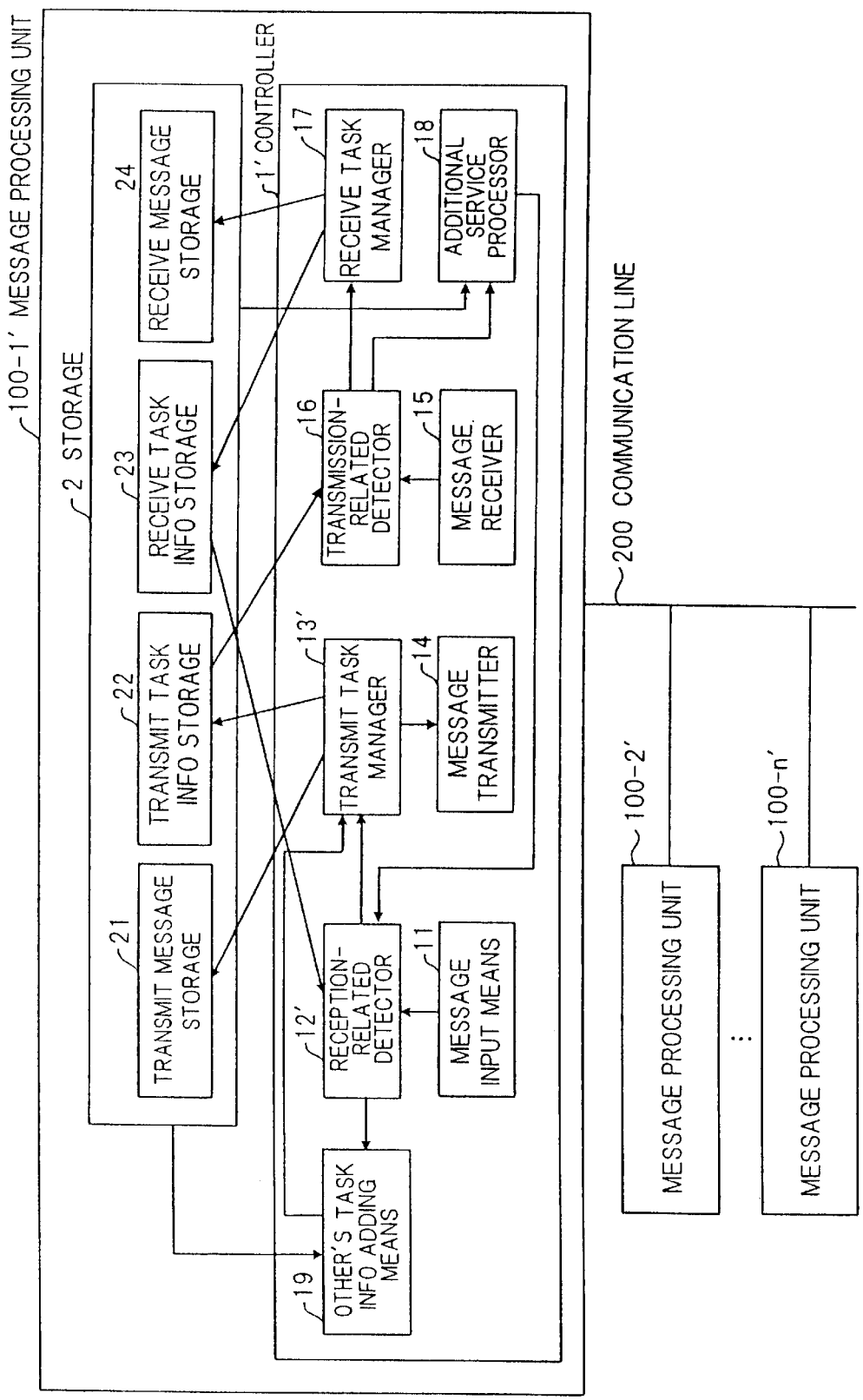
FIG. 5 is a block diagram showing a message processing device in a second preferred embodiment according to the invention.

The additional service processor 18 informs the user of the reception of the message related to the previously-transmitted message by, e.g., displaying the second ID sent from the transmission-related detector 16 and the message ID of the reply message on a display (not shown) (S15). Also, the receive task manager 17 conducts like operation described earlier to the reply message sent from the transmission-related detector 16 Message Message processing method and device including system and recording medium in the second preferred embodiment will be explained in FIG. 5. As shown, several message processing units 100-1' to 100-n' are connected through a communication line 200.

The message processing unit 100-1' is provided with a controller 1' and a storage 2. The storage 2 has the same composition as that in FIG. 1. The controller 1' is different from the controller 1 in FIG. 1 in that it has an other's task information adding means 19, a reception-related detector 12' replacing the reception-related detector 12, and a transmit task manager 13 replacing the transmit task manager 13'.

The functions of the other's task information adding means 19 are to search the content of a receive message registered in the receive message storage 24 when a transmit message made by using the message input means 11 relates to the receive message registered in the receive message storage 24, to extract the transmit ID of the receive message to be given by the original transmitter, and to add the extracted transmit ID as a second ID to the transmit message.

The reception-related detector 12 has the same function as the reception-related detector 12, except that it sends the transmit message to the other's task information adding means 19 not the transmit task manager 13 when the transmit message made by the message input means 11 is provided with a first ID identical with a transmit ID registered in the transmit task information storage 22.

The transmit task manager 13' has the same function as the transmit task manager 13, except that it receives the transmit message from not only the reception-related detector 12 but also the other's task information adding means 19.

Figure 6:
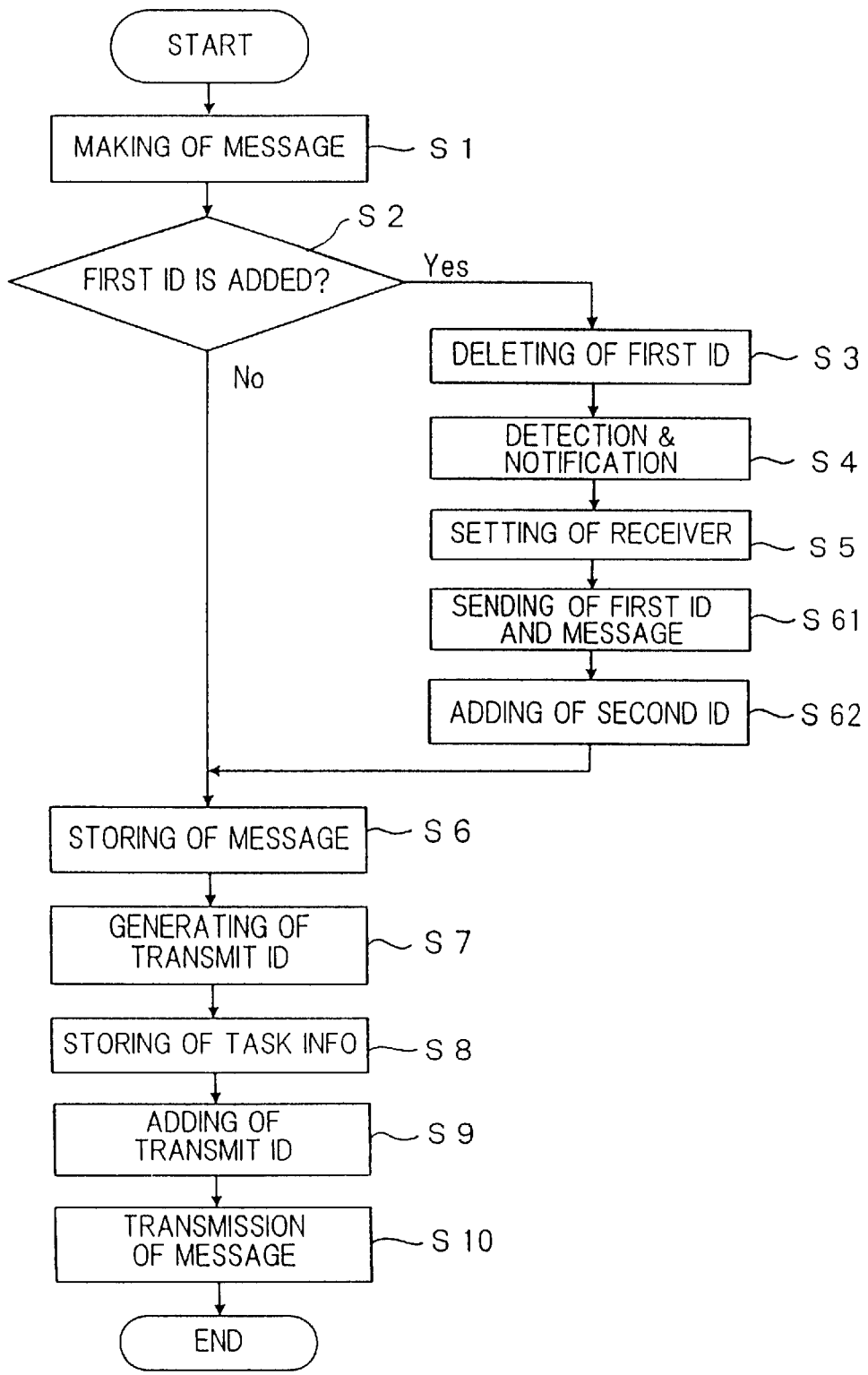
FIG. 6 is a flow chart illustrating an example of the message-transmitting process of message processing units 100-1' to 100-n'.

Referring to FIG. 6, the operations of the message processing method and device in the second embodiment will be explained below. FIG. 6 is a flow chart showing an example of the message-transmitting operation in the message processing units 100-1' to 100-n'. In the message processing units 100-1' to 100-n', operations at S61, S62 are conducted other than the operations at S1 to S10 in FIG. 3 when transmitting a message. Meanwhile, the message-receiving operations of the message processing units 100-1' to 100-n' are similar to those of the message processing units 100-1 to 100-n. Namely, the message-receiving operations of the message processing units 100-1' to 100-n' are conducted as shown in FIG. 4.

The message-transmitting operations of the message processing units 100-1' to 100-n' will be explained below. Meanwhile, explained is only the case that a message related to a previously-received message is transmitted because the other operations are similar to those of the message processing units 100-1' to 100-n shown in FIG. 1.

Now, for example, user B of the message processing unit 100-2' reads a message from user A of the message processing unit 100-1' to be registered in the receive message storage 24, judging that a reply message needs to be sent to user A.

Then, user B makes the reply message by using the message input means 11 of the message processing unit 100-1' (FIG. 6, S1). In this case, user B adds the receive ID given to the message from user A by the receive task manager 17 as a first ID to the reply message.

The reception-related detector 12 deletes the first ID from the reply message as the judgement at S2 becomes "Yes" when the reply message is made by the message input means 11, then informing the additional service processor 18 of the message ID of the reply message and the first ID that was given to the reply message (S3, S4).

Receiving this information, the additional service processor 18 determines the receiver of the reply message to be "user-A" as described earlier, setting "user-A" as the receiver 41 in the reply message by using the reception-related detector 12' (S5).

Then, the reception-related detector 12' sends the reply message and the first ID given to the reply message to the other's task information adding means 19 (S61). Then, the other's task information adding means 19 extracts the transmit ID to be given by the original transmitter from a receive message provided with a receive ID identical with the first ID of receive messages registered in the receive message storage 24, adding the extracted transmit ID as a second ID to the reply message (S62). The reply message with the second ID is transmitted to user A as described earlier (S6 to S10). Also, user A receives the reply message as described earlier (FIG. 4, S11 to S19).

In the second embodiment, a correct second ID can be surely added to a transmit message such as a reply message to be related to a previously-received message.

Next, referring to FIGS. 1 to 4 and 7 to 12, the message processing method and device in the first preferred embodiment will be detailed.

First, the case that user A of the message processing unit 100-1 transmits a message to request a reply from user B of the message processing unit 100-2 will be explained.

Figure 7:
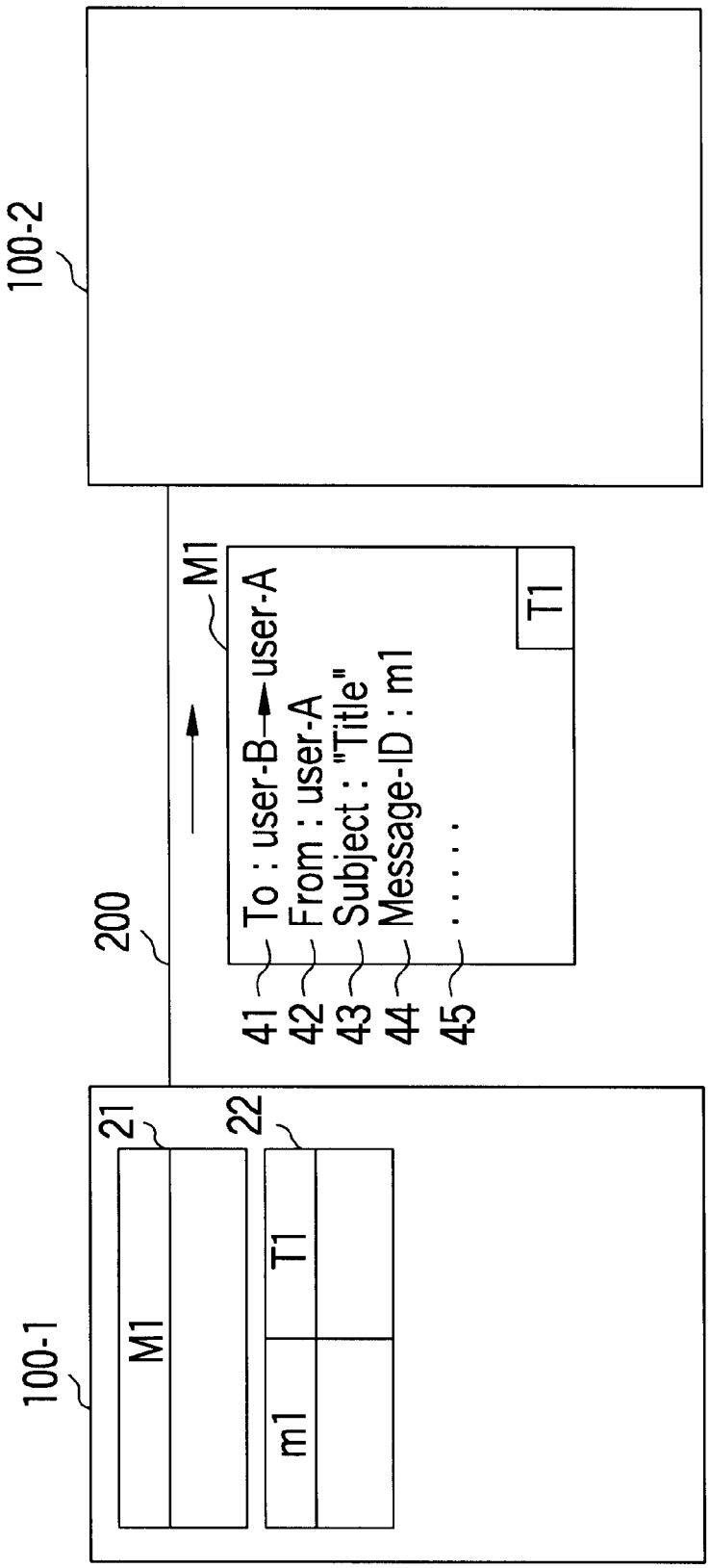
FIG. 7 is an illustration showing an example of message-transmitting operation in the message processing device of the first or second embodiment.

User A makes a message M1 shown in FIG. 7 by operating the message input means 11 (FIG. 3, S1). At this time, a transmit ID T1 is not set in the content 45. The sender 41 of the message M1 is set as "user-B→user-A".

When the message M1 shown in FIG. 7 is made by using the message input means 11, the reception-related detector 12 sends the message M1 to the transmit task manager 13 as no first ID is added to the message M1('No' at S2).

The transmit task manager 13 receives the message M1, registering it into the transmit message storage 21 (S6), generating the transmit ID T1 (S7). The transmit ID T1 is, for example, generated by combining ID, e.g., MS1, to be assigned to the message processing unit 100-1 with a serial number that is increased by +1 every message transmission.

The transmit task manager 13 registers the generated transmit ID T1 and the message ID m1 of the message M1 into the transmit task information storage while relating to each other (S8), further adding the transmit ID T1 generated at S7 to the message M1 as shown in FIG. 7 (S9).

Then, the message transmitter 14 transmits the message M1 with the transmit ID T1 through the communication line 200 to the message processing unit 100-2 (S10).

The message receiver 15 of the message processing unit 100-2 receives the message M1 from user A, then sending it to the transmission-related detector 16 (FIG. 4, S11).

The transmission-related detector 16 sends the message M1 to the receive task manager 17 as no second ID is added to the message M1 sent from the message receiver 15 ('No' at S12). Receiving the message M1, the transmission-related detector 16 first generates a receive ID (T2) to identify the reception of the message M1 (S16) Here, the receive ID is generated by combining ID to be assigned to the message processing unit 100-2 with a serial number that is increased by +1 every message reception.

Figure 8:
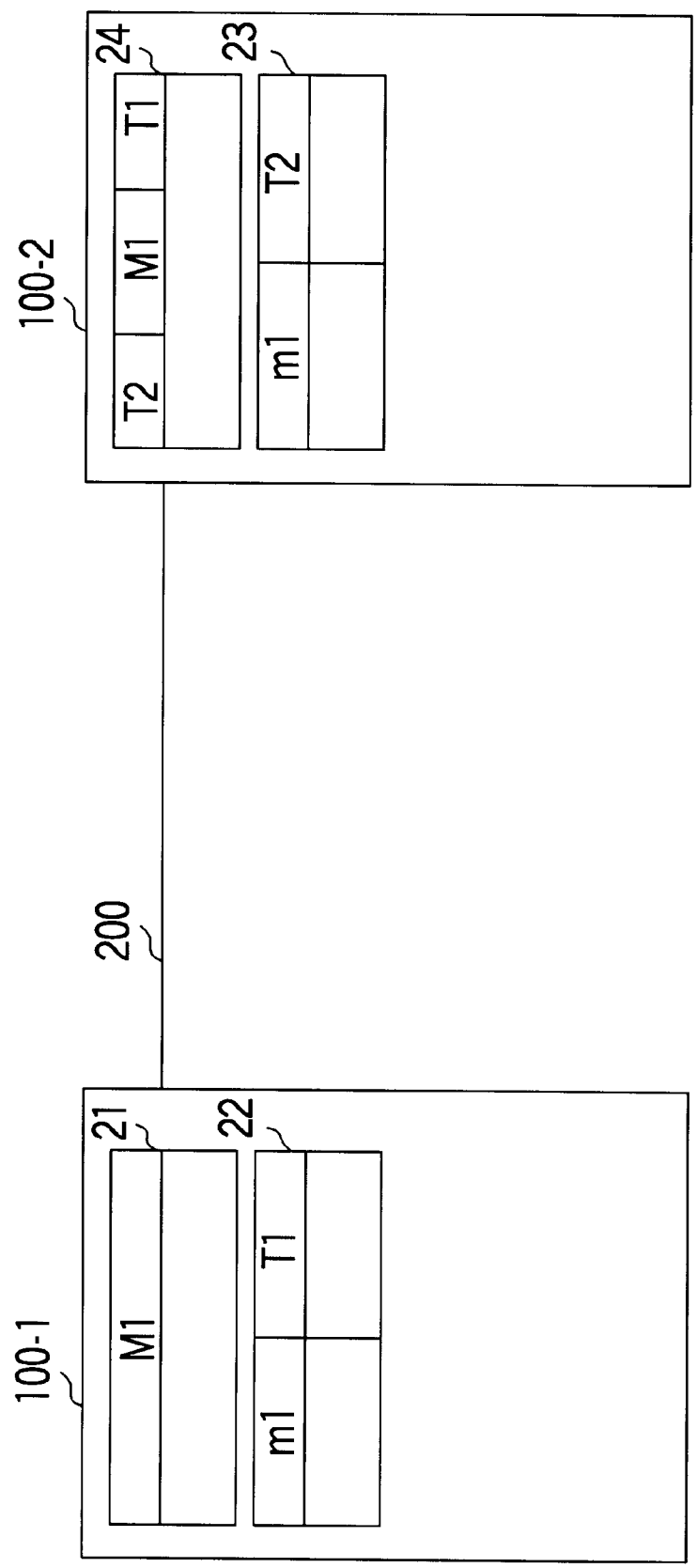
FIG. 8 is an illustration showing an example of message-receiving operation in the message processing device of the first or second embodiment.

Then, the receive task manager 17, as shown in FIG. 8, registers the receive ID T2 generated at S16 and the message ID m1 of the message M1 into the receive task information storage 23 while relating to each other (S17), further adding the receive ID T2 to the message M1, registering it into the receive message storage 24 (S19).

The receive ID T2 can be added to the message M1 by overwriting it into the sender 42. In most cases, a reply to a receive message is returned to the sender of the receive message. Thus, by overwriting as described above, the transmit message (reply message) can be made including more surely the receive ID T2 added to the receive message M1. However, in this case, the receive task manager 17 needs to set "user-A", which was set into the sender 42, into, e.g., the content when it adds the receive ID T2 to the message M1.

Figure 9:
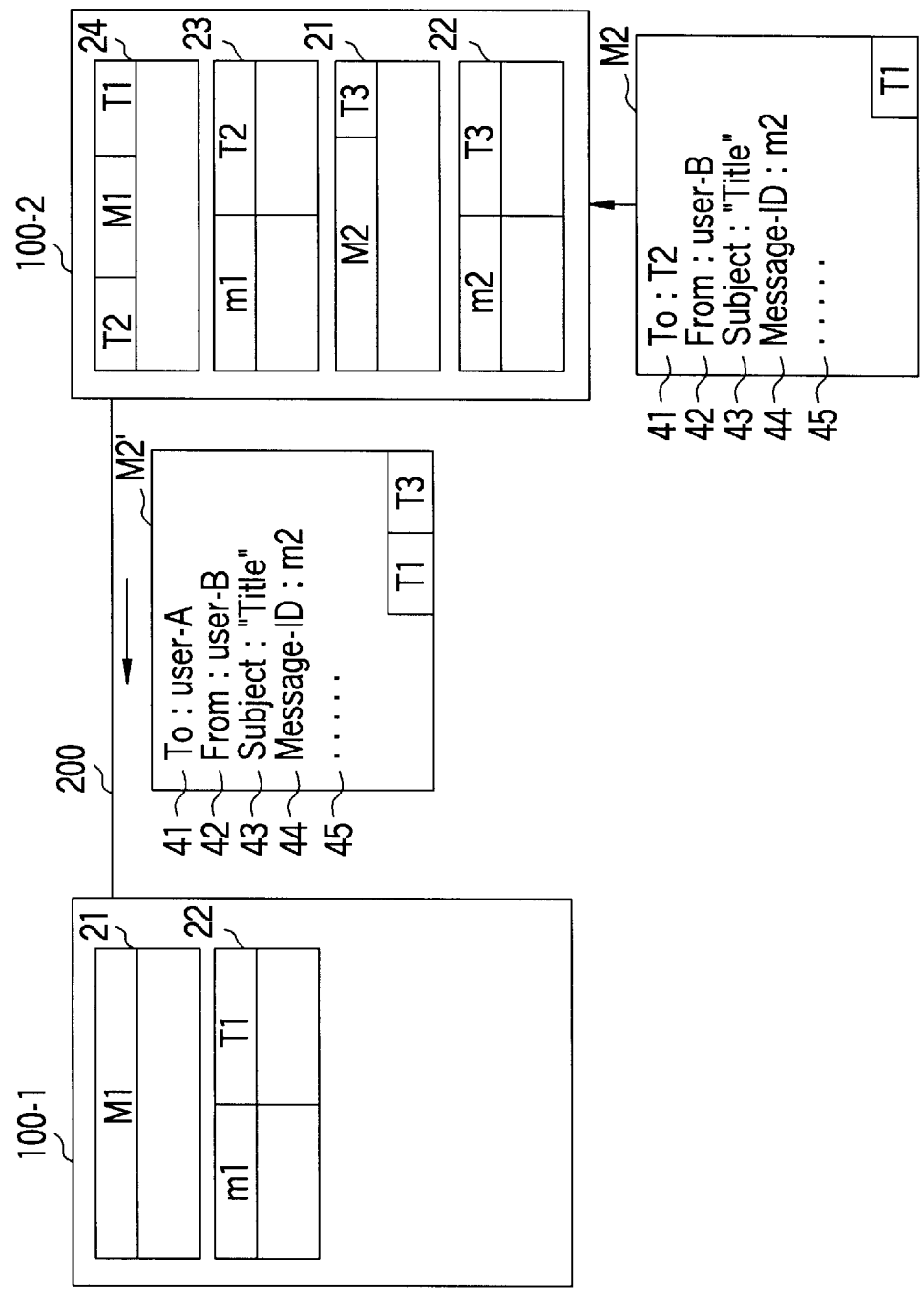
FIG. 9 is an illustration showing an operation in transmitting a reply message in the message processing device of the first embodiment.

User B reads the message M1 registered in the receive message storage 24, judging that a reply message needs to be sent to user A, then making a reply message M2 shown in FIG. 9 by using the message input means 11 (FIG. 3, S1). In this case, user B adds the transmit ID T1 given to the message M1 as a second ID into the content of the reply message M2 as well as adding the receive ID T2 given to the sender 42 of the message M1 as a first ID to the receiver 41 of the reply message M2.

The reception-related detector 12 deletes the first ID T2 from the receiver 41 of the reply message as the first ID T2 identical with the receive ID registered in the receive message is added into the receiver 41 of the reply message M2 ("Yes" at S2) when the reply message M2 shown in FIG. 9 is made by the message input means 11, then informing the additional service processor 18 of the message ID m2 of the reply message M2 and the first ID T2 given to the reply message M2 (S3, S4).

Receiving this information, the additional service processor 18 determines the receiver of the reply message M2 to be "user-A" as described earlier, setting "user-A" as the receiver 41 in the reply message M2 by using the reception-related detector 12 (S5).

Then, the transmit task manager 13 registers the reply message M2 into the transmit message storage 21, then generating a transmit ID (T3) to identify the transmission of the reply message M2. Further the transmit task manager 13 registers the transmit ID T3 and the message ID m2 of the reply message M2 into the transmit task information storage 22 while relating to each other, adding the transmit ID T3 generated at S7 to the reply message M2 (S8, S9). As a result, the reply message M2 is processed into a message M2' in FIG. 9.

Then, the reply message is transmitted through the communication line 200 to the message processing unit 100-1 for user A by the message transmitter 14 (S10).

The message receiver 15 of the message processing unit 100-1 receives the reply message M2' transmitted from user B, then sending it to the transmission-related detector 16 (FIG. 4, S11).

The transmission-related detector 16 deletes the second ID T1 in the reply message M2' as the second ID identical with the transmit ID T1 registered in the transmit task information storage 22 is added to the reply message M2' ('Yes' at S12), then sending the second ID T1 and the message ID m2 of the reply message M2' to the additional service processor 18 as well as sending the reply message M2' to the receive task manager 17 (S13, S14).

The additional service processor 18 informs user A of the reception of the message related to the previously-transmitted message by, e.g., displaying the second ID T1 sent from the transmission-related detector 16 and the message ID m2 of the reply message M2' on a display (not shown) (S15). Also, the receive task manager 17 conducts like operation described earlier to the reply message M2 sent from the transmission-related detector 16.

Next, operations in the case that user A of the message processing unit 100-1 sends a message to request user B of the message processing unit 100-2 to circulate it through users C, D and A.

Figure 10:
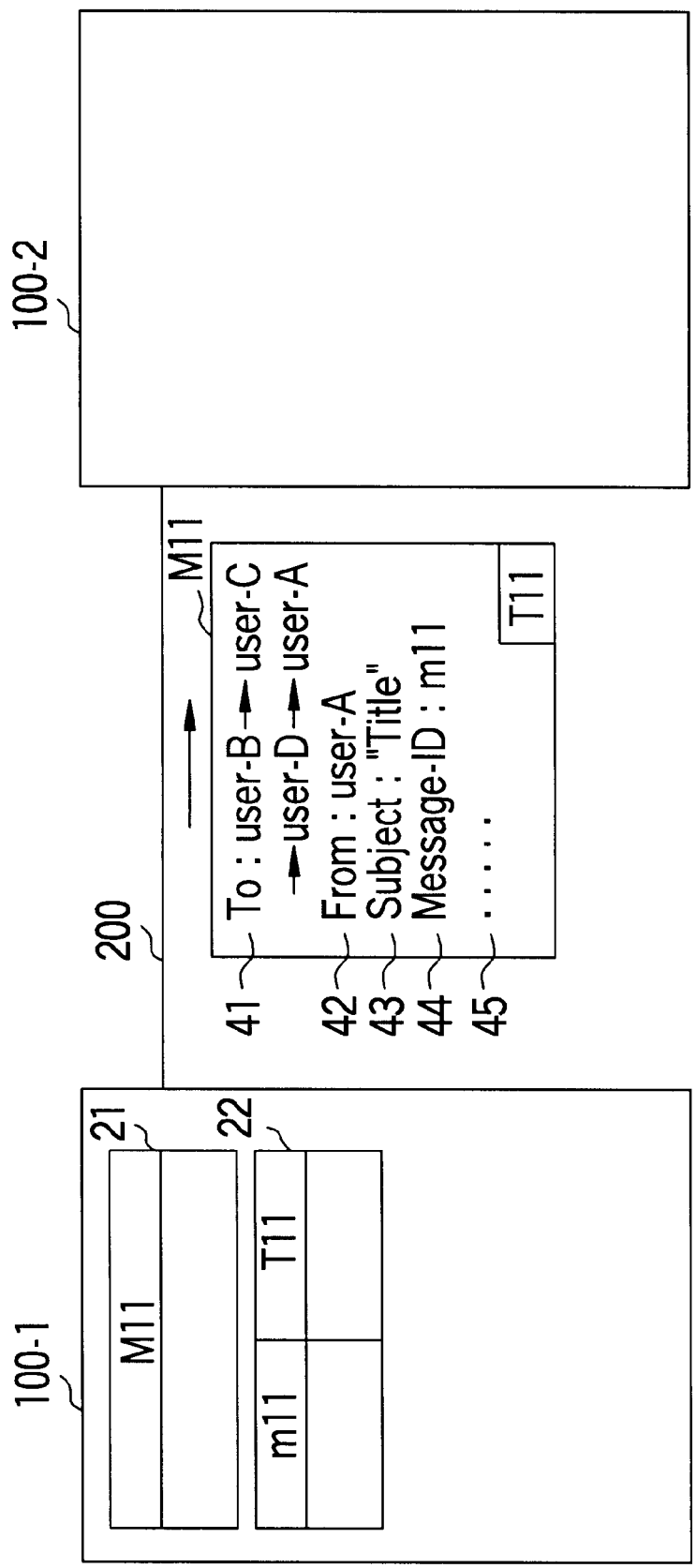
FIG. 10 is an illustration showing an operation in transmitting a message in the message processing device of the first or second embodiment.

User A makes a message M11 shown in FIG. 10 by using the message input means 11 (FIG. 3, S1). The receiver 41 of the message M11 is set to be "user-B→user-C→user-D→user-A", which means that the message is circulated in the order of user B, C, D and A.

When the message M11 shown in FIG. 10 is made through the message input means 11, the operations of S6 to S10 are conducted as no first ID is not added to the message M11 ('No' at S2).

As a result, the message M11 is stored in the transmit message storage 21, a transmit ID T11 to identify the transmission of the message M11 is generated, the message ID m11 and transmit ID T11 of the message M11 are registered into the transmit task information storage 22, and the message M11 is transmitted to the message processing unit 100-2 for user B.

The message receiver 15 of the message processing unit 100-2 receives the message M11, sending it to the transmission-related detector 16 (FIG. 4, S11).

Figure 11:
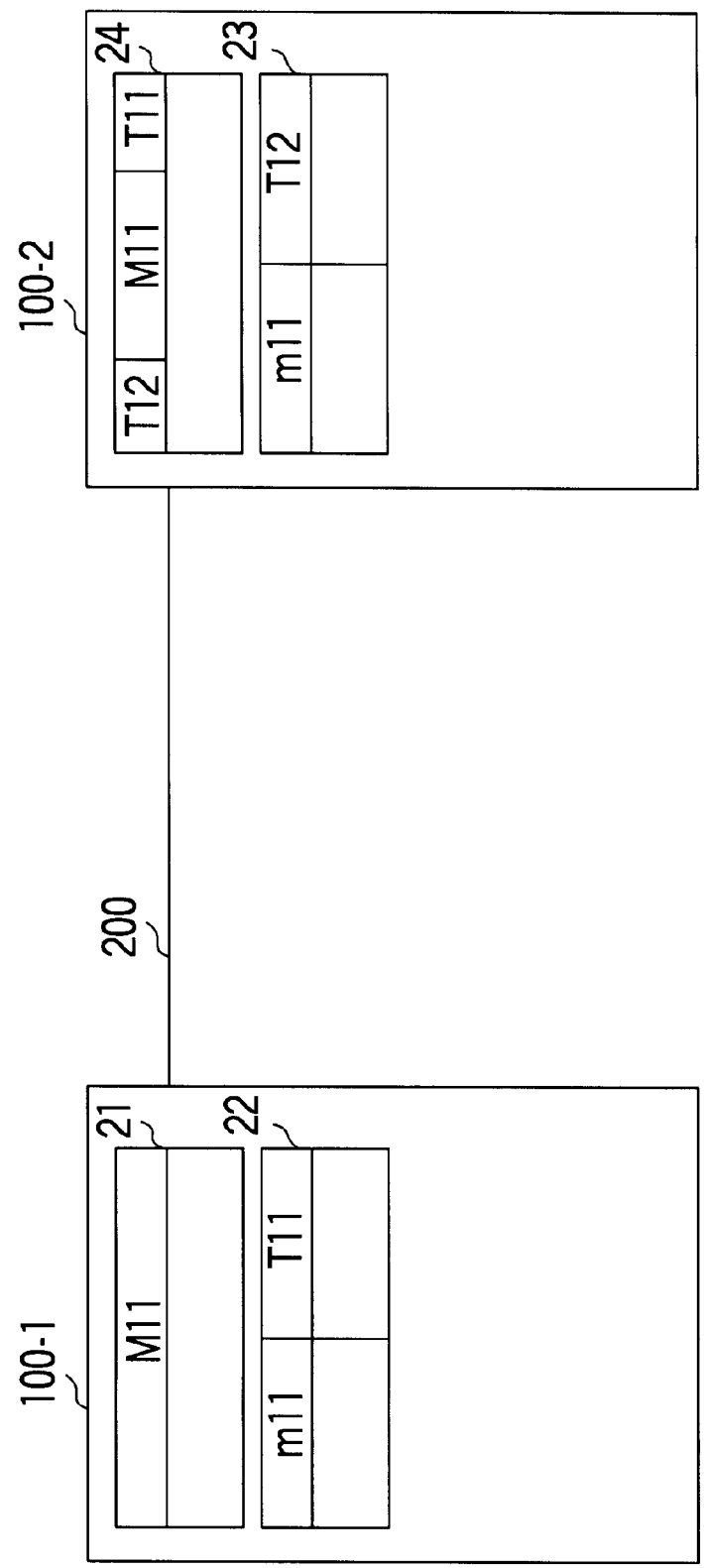
FIG. 11 is an illustration showing an operation in receiving a message in the message processing device of the first or second embodiment.

The processes of S16 to S19 are conducted as no second ID is not added to the message M11 sent to the transmission-related detector 16 ('No' at S12). As a result, a receive ID T12 to identify the reception of the message M11 is generated, the message ID m11 and receive ID T12 of the message M11 are registered into the receive task information storage 23, and the message M11 is registered into the receive message storage 24 while adding the receive ID T12 (FIG. 11).

Figure 12:
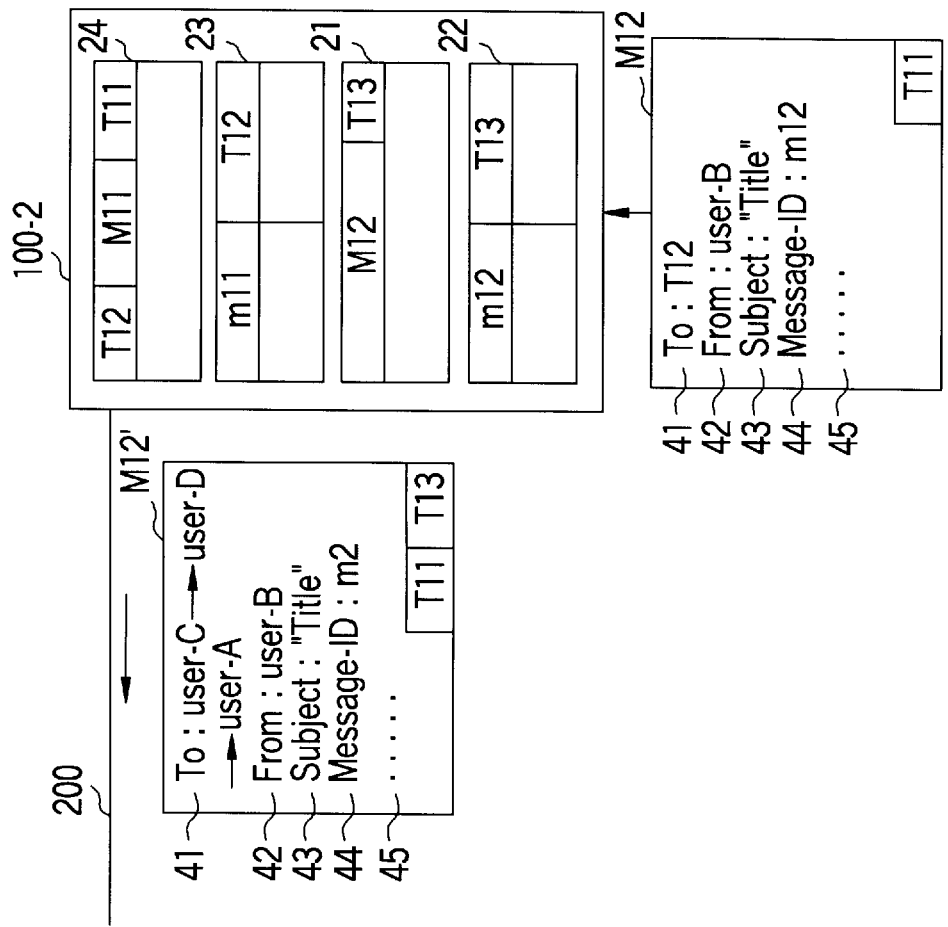
FIG. 12 is an illustration showing an operation in transmitting a circular message in the message processing device of the first embodiment.

User B reads the message M11 registered in the receive message storage 24, judging that a circular message needs to be sent to user C, D and A, then making a message M12 shown in FIG. 12 by using the message input means 11 (FIG. 3, S1). In this case, user B adds the transmit ID T11 given to the message M11 as a second ID into the content 45 of the message M12 as well as adding the receive ID T12 given to the sender 42 of the message M11 as a first ID to the receiver 41 of the message M12.

The reception-related detector 12 deletes the first ID T12 from the receiver 41 of the message M12 as the first ID T12 identical with the receive ID registered in the receive message is added into the receiver 41 of the message M12 ("Yes" at S2) when the message M12 shown in FIG. 12 is made by the message input means 11, then informing ID the additional service processor 18 of the message ID m12 of the message M12 and the first ID T12 given to the message M12 (S3, S4).

Receiving this information, the additional service processor 18 determines the receiver of the reply message M12 to be "user-C→user-D→user-A" as described earlier, setting "user-C→user-D→user-A" as the receiver 41 in the message M12 by using the reception-related detector 12 (S5). As a result, the message M12 is processed into a message M12' in FIG. 12. The other processes to follow are similar to those in the reply message.

In the first embodiment, information to indicate the original sender (user A in 'user-B→user-A' in FIG. 7) is included in the receiver 41 of the message to request a reply message or a circular message so that the receiver of the reply message or circular message can be automatically determined by the additional service processor 18. However, such information is not necessary to include when the user to send the reply message or circular message sets the receiver by himself.

Next, referring to FIGS. 4 to 8, 10, 11, 13 and 14, the message processing method and device in the second preferred embodiment will be detailed.

First, the case that user A of the message processing unit 100-1' transmits a message to request a reply from user B of the message processing unit 100-2' will be explained.

User A makes the message M1 shown in FIG. 7 by operating the message input means 11 (FIG. 6, S1). At this time, the transmit ID T1 is not set in the content 45.

When the message M1 shown in FIG. 7 is made by using the message input means 11, the reception-related detector 12 sends the message M1 to the transmit task manager 13 as no first ID is added to the message M1('No' at S2).

After receiving the message M1, the transmit task manager 13' conducts the processes of S6 to S9. As a result, the message M1 is registered into the transmit message storage 21, a transmit ID T1 is generated, the transmit ID T1 and the message ID m1 of the message M1 are registered into the transmit task information storage 22, and the transmit ID T1 is added to the message M1.

Then, the message transmitter 14 transmits the message M1 with the transmit ID T1 through the communication line 200 to the message processing unit 100-2 for user B (S10).

After receiving the message M1, the message processing unit 100-2 conducts like operations as described earlier (FIG. 4, S1, S12, S16 to S19). As a result, the receive ID T2 is generated, the message ID m1 and receive ID T2 of the message M1 are registered into the receive task information storage 23, and the message M1 is registered into the receive message storage 24 while adding the receive ID T2 (FIG. 8).

Figure 13:
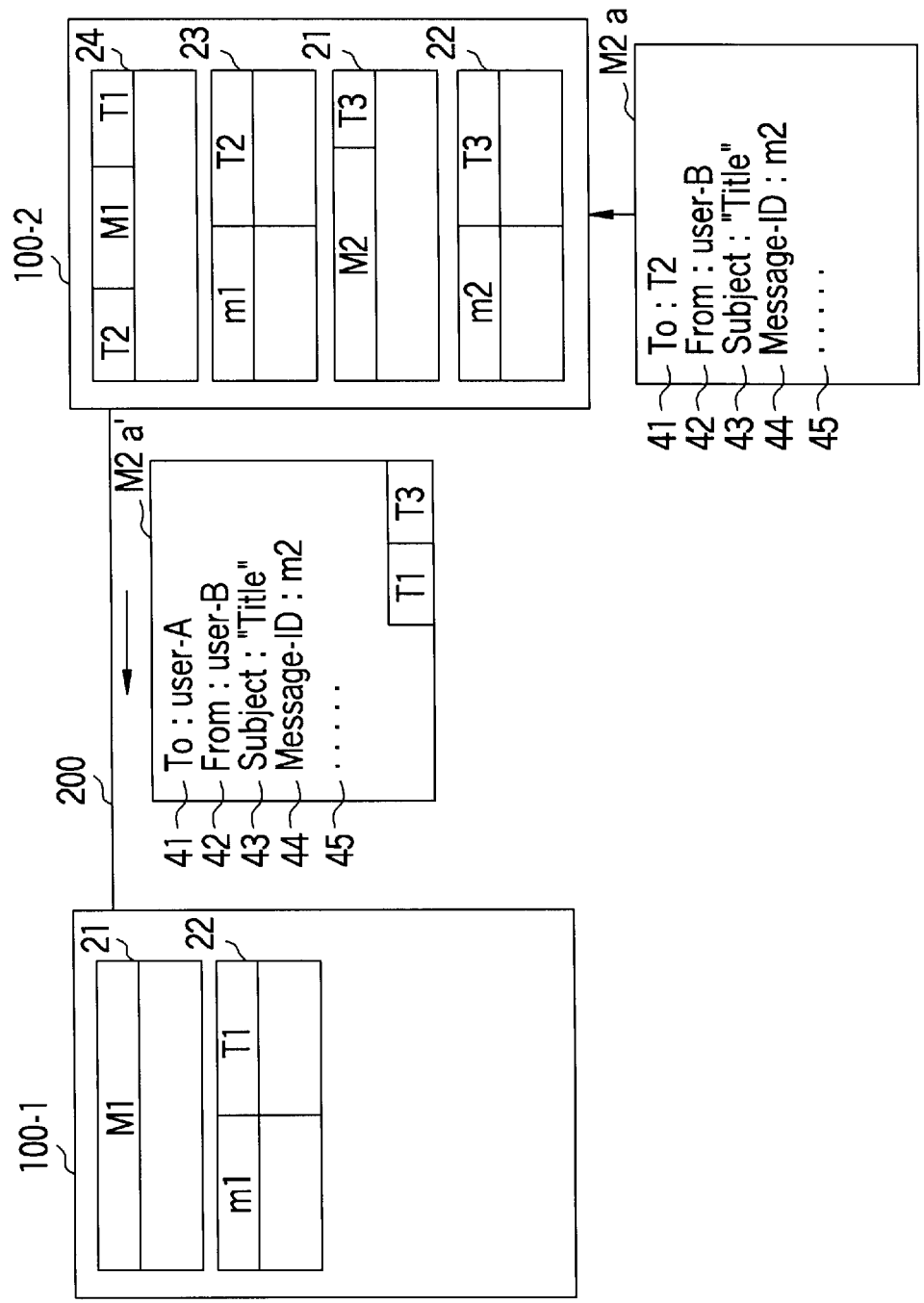
FIG. 13 is an illustration showing an operation in transmitting a reply message in the message processing device of the second embodiment.

User B reads the message M1 registered in the receive message storage 24, judging that a reply message needs to be sent to users C, D and A, then making a reply message M12a shown in FIG. 13 by using the message input means 11 (FIG. 6, S1). In this case, no second ID is added to the content 45 of the reply message M2a, which is different from the message M2 shown in FIG. 9.

The reception-related detector 12' deletes the first ID T2 from the receiver 41 of the reply message M2a as the first ID T2 identical with the receive ID registered in the receive message detector 24 is added into the receiver 41 of the reply message M2a ("Yes" at S2) when the reply message M2a shown in FIG. 13 is made by the message input means 11, then informing the additional service processor 18 of the message ID m2 of the reply message M2a and the first ID T2 that was given to the reply message M2a (S3, S4).

Receiving this information, the additional service processor is 18 determines the receiver of the reply message to be "user-A" as described earlier, setting "user-A" into the receiver 41 of the reply message M2a by using the reception-related detector 12' (S5)

Then reception-related detector 12' sends the first ID T2 and reply message M2a to the other's task information adding means 19 (S61)

Then, the other's task information adding means 19 extracts the transmit ID T1 from the receive message M1 provided with the receive ID T2 identical with the first ID T2 of receive messages registered in the receive message storage 24, adding the extracted transmit ID as a second ID to the reply message M2a (S62).

After the other's task information adding means 19 completes the operations, the transmit task manager 13 and message transmitter 14 conduct the operations of S6 to S10. As a result, the reply message M2a' shown in FIG. 13 is transmitted to the message processing unit 100-1 for user A. Then, the message processing unit 100-1 receives the reply message M2a', conducting like operations as described earlier.

Next, operations in the case that user A of the message processing unit 100-1' sends a message to request user B of the message processing unit 100-2' to circulate it through users C, D and A.

User A makes a message M11 shown in FIG. 10 by using the message input means 11 of the message processing unit 100-1' (FIG. 6, S1). At this time, the transmit ID T11 is not added to the message M11.

When the message M11 shown in FIG. 10 is made through the message input means 11, the operations of S6 to S10 are conducted as no first ID is not added to the message M11 ('No' at S2).

As a result, the message M11 is stored in the transmit message storage 21, the transmit ID T11 to identify the transmission of the message M11 is generated, the message ID m11 and transmit ID T11 of the message M11 are registered into the transmit task information storage 22, and the message M11 is transmitted to the message processing unit 100-2 for user B.

The message processing unit 100-2 receives the message M11 from user A, then conducting the operations of S11, S12 and S16 to S19 shown in FIG. 4. As a result, the receive ID T12 is generated, the message ID m11 and receive ID T12 of the message M11 are registered into the receive task information storage 23, and the message M11 is registered into the receive message storage 24 while adding the receive ID T12 (FIG. 11).

Figure 14:
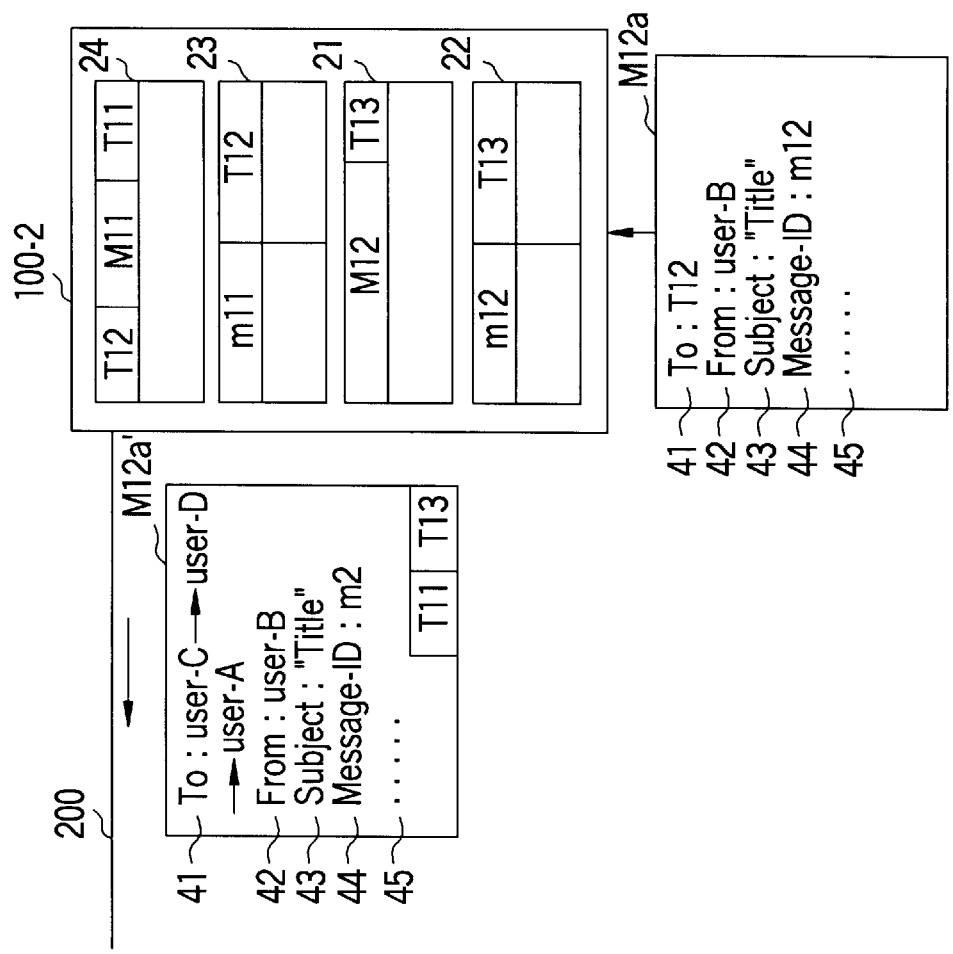
FIG. 14 is an illustration showing an operation in transmitting a circular message in the message processing device of the second embodiment.

User B reads the message M11 registered in the receive message storage 24, judging that a circular message needs to be sent to user C, D and A, then making a message M12a shown in FIG. 14 by using the message input means 11 (FIG. 6, S1). In this case, no second ID is added to the content 45 of the message M12a, which is different from the message M12 shown in FIG. 12.

The reception-related detector 12' deletes the first ID T12 from the receiver 41 of the message M12a as the first ID T12 identical with the receive ID registered in the receive message is added into the receiver 41 of the message M12a ("Yes" at S2) when the message M12a shown in FIG. 14 is made by the message input means 11, then 10 informing the additional service processor 18 of the message ID m2 of the message M12a and the first ID T12 given to the message M12a (S3, S4).

Receiving this information, the additional service processor 18 determines the receiver of the reply message M12a to be "user-C→user-D→user-A" as described earlier, setting "user-C→user-D→user-A" as the receiver 41 in the message M12a by using the reception-related detector 12 (S5).

Then reception-related detector 12' sends the first ID T12 and reply message M12a to the other's task information adding means 19 (S61).

Then, the other's task information adding means 19 extracts the transmit ID T11 from the receive message M1 provided with the receive ID T12 identical with the first ID T12 of receive messages registered in the receive message storage 24, adding the extracted transmit ID as a second ID to the reply message M12a (S62).

After the other's task information adding means 19 completes the operations, the transmit task manager 13' and message transmitter 14 conduct the operations of S6 to S10. As a result, the reply message M12a' shown in FIG. 14 is transmitted to the message processing unit 100-1 for user A. Then, the message processing unit 100-1 receives the reply message M12a', conducting like operations as described earlier.

Although, in the above embodiment, the receiver of the reply message M2a is set by the additional service processor 18, it may be set by the reception-related detector 12'.

In this case, when receiving the message M1 as shown in FIG. 8, the receive ID T2 to identify the reception of the message M1, the message ID m1 of the message M1 and sender 'user-A' are registered into the receive task information storage 23 while being related to one another. Thereafter, when the reply message M2a shown in FIG. 13 is made by user B, the reception-related detector 12 deletes the first ID T2 set in the receiver 41 of the reply message M2a, further setting the receiver 41 into 'user-A' who is registered in the receive task information storage 23 while being related to the first ID T2.

Figure 15:
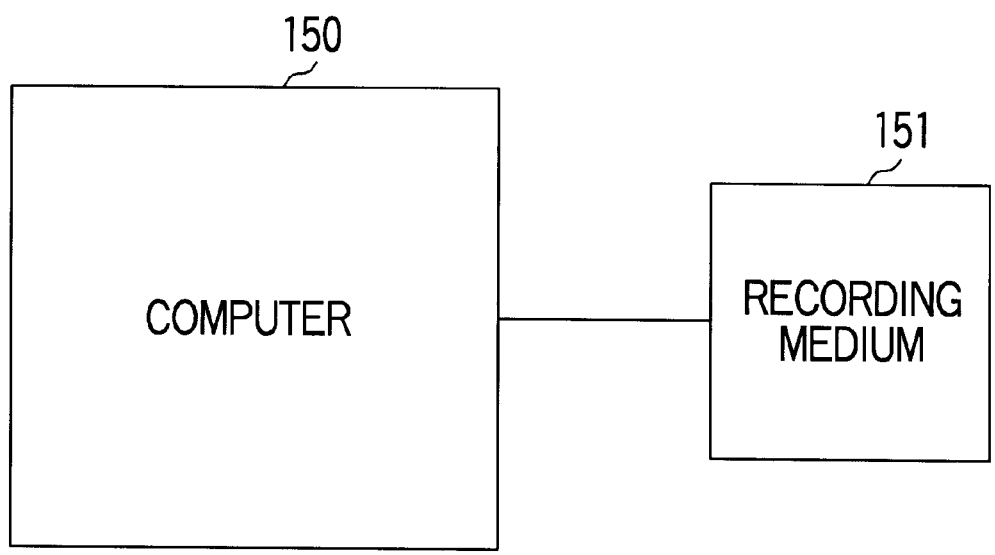
FIG. 15 is a block diagram showing a hardware composition of the message processing unit 100-1.

FIG. 15 is a block diagram showing the hardware composition of the message processing unit 100-1 in FIG. 1, which is composed of a computer 150 and a recording medium 151.

The recording medium 151 provided for the computer 150 stores a program for processing messages. The recording medium 151 can be a magnetic disk, a semiconductor memory or the like.

The message-processing program stored in the recording medium 151 is read out by the computer 150, and the computer 150 is thereby so controlled that the message input means 11, reception-related detector 12, transmit task manager 13, message transmitter 14, message receiver 15, transmission-related detector 16, transmit task manager 17 and additional service processor 18 in FIG. 1 can be set up on the computer 150.

The message processing unit 100-1' also has a hardware composition like this. Thus, the message-processing program stored in the recording medium 151 is read out by the computer 150, and the computer 150 is thereby so controlled that the message input means 11, reception-related detector 12', transmit task manager 13', message transmitter 14, message receiver 15, transmission-related detector 16, transmit task manager 17, additional service processor 18 and other's task information adding means in FIG. 5 can be set up on the computer 150.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A message processing method, comprising the steps of:
   transmitting a transmit message to a recipient message processing unit, wherein said transmit message includes a transmit ID corresponding to a transmission of said transmit message and an ID data field;
   said recipient message processing unit receiving said transmit message; and
   said recipient message processing unit automatically judging and indicating, without any input from a user-recipient, that said received transmit message is a reply to a prior transmit message without the need for a specific request that keeps track of transmit and received messages when said ID data field of said received transmit message contains a prior transmit ID that corresponds to a prior transmission of said prior transmit message by said recipient message processing unit.

2. A message processing method, comprising the steps of:
   generating a receive ID to identify the reception of a received message when said received message is received by a recipient message processing unit;
   said recipient message processing unit registering a correspondence between said received message and said generated receive ID;
   said recipient message processing unit transmitting a transmit message, wherein said transmit message includes an ID data field;
   said recipient message processing unit automatically judging and indicating, without any input from a user-recipient, that said transmit message is related to a previously-received received message without the need for a specific request that keeps track of transmit and received messages when said ID data field of said transmit message contains a receive ID that corresponds to a reception of said previously-received received message by said recipient message processing unit.

3. A message processing method, comprising the steps of:
   transmitting a transmit message to a second message processing device while adding to said transmit message a transmit ID to identify the transmission of said transmit message, and registering a correspondence between said transmit message and said transmit ID into a first storage when said transmit message is transmitted to said second message processing device from a first message processing device; and said second message processing device generating a receive ID to identify the reception of a first received message when said first received message is received by said second message processing device from said first message processing device, registering said first received message into a second storage while adding said generated receive ID to said first received message, extracting a return transmit ID provided by said first message processing device from a second received message by retrieving from said second storage said transmit ID corresponding to said second received message and transmitting from said second message processing device a return transmit message to said first message processing device while adding said extracted return transmit ID to said return transmit message;

wherein said first message processing device receives said return transmit message and automatically judges and indicates, without any input from a user, that a third received message is related to a previously-transmitted transmit message without the need for a specific request that keeps track of transmit and received messages when an ID data field of said third received message contains a transmit ID registered in said first storage that corresponds to said previously transmitted transmit message.

4. A message processing device, comprising:

a storage;

a reception-managing means for generating a receive ID to identify the reception of a received message when said received message is received by a recipient message processing unit, and for registering a correspondence between said received message and said generated receive ID into said storage; and a reception-related detector for automatically judging and indicating, without any input form a user, that a transmit message is related to a previously-received received message without the need for a specific request that keeps track of transmit and received messages when and ID data field of said transmit message contains a transmit ID registered in said storage that corresponds to said previously-received received message.

5. A message processing system comprising:

a first message processing device which comprises a first storage, a transmission-managing means for adding to a transmit message a transmit ID to identify the transmission of a transmit message and for registering a correspondence between said transmit message and said transmit ID into said first storage when said transmit message is transmitted, a message transmitter for transmitting a transmit message provided with a transmit ID by said transmission-managing means to a second message processing device, and a transmission-related detector for judging and indicating that a first received message is related to a previously-transmitted transmit message without the need for a specific request that keeps track of transmit and received messages when an ID data field of said first received message contains a transmit ID registered in said first storage that corresponds to said previously-transmitted transmit message; and said second message processing device which comprises a second storage, a reception-managing means for generating a received ID to identify the reception of a second received message when said second received message is received from said first message processing device, and a register for registering said second received message into said second storage while adding said generated receive ID to said second received message, an information adding means for extracting a return transmit ID given by said first message processing device from a third received message by retrieving from said second storage a transmit ID that corresponds to said third received message registered in said second storage and for adding said return transmit ID to a return transmit message, and a message transmitter for transmitting to said first message processing device said return transmit message provided with said return transmit ID.

6. A mechanically-readable recording medium, which stores a program to operate a computer as a reception-managing means for generating a unique receive ID to identify the reception of a received message when said received message is received by said reception-managing means and for registering into a storage the correspondence between said received message and said generated receive ID, and a reception-related detector for automatically judging and indicating, without any input from a user, that a transmit message is related to a previously-received receive message without the need for a specific request that keeps track of transmit and received messages when an ID data field of said transmit message contains a receive ID that corresponds to a reception of said previously-received received message.

7. A first mechanically-readable recording medium, which stores a program to operate a first message processing device computer as a transmission-managing means for adding a transmit ID to identify the transmission of a transmit message to said transmit message and for registering a correspondence between said transmit message and said transmit ID into a first storage when said transmit message is transmitted, a message transmitter for transmitting said transmit message provided with a transmit ID to a second message processing device, and a transmission-related detector for automatically judging, without any input from a user, that a first received message is related to a previously-transmitted transmit message without the need for a specific request that keeps track of transmit and received messages when an ID data field of said first received message contains a transmit ID that corresponds to said previously-submitted transmit message registered in said first storage, and a second mechanically-readable recording medium to operate a second message processing device computer as a reception-managing means for generating a receive ID to identify the reception of a second received message when said second received message is received by said second message processing device from said first message processing device, and for registering said second received message into a second storage while adding said generated receive ID to said second received message, an information adding means for extracting a return transmit ID given by said first message processing device from a third received message by retrieving from said second storage a transmit ID that corresponds to said third received message registered in said second storage and for adding said extracted return transmit ID to a return transmit message, and a message transmitter for transmitting said return transmit message provided with said return transmit ID.

* * * * *

UNITED STATES PATENT AND TRADEMARK OFFICE
CERTIFICATE OF CORRECTION

PATENT NO.    : 6,438,213 B2
DATED         : August 20, 2002
INVENTOR(S)   : Kenji Takeda and Tomoki Osawa It is certified that error appears in the above-identified patent and that said Letters Patent is hereby corrected as shown below:

Column 8,
Line 10, delete "massage" insert -- message --

Column 9,
Line 38, delete "(S1)" insert -- (S11) --

Column 17,
Line 16, delete "10"
Line 30, delete "M1" insert -- M11 --

Signed and Sealed this

Tenth Day of December, 2002

JAMES E. ROGAN
*Director of the United States Patent and Trademark Office*